United States Patent
Higbie

(10) Patent No.: US 7,637,812 B2
(45) Date of Patent: Dec. 29, 2009

(54) ELECTRONIC GAME HAVING AN AUTOMATIC CONTINUE FEATURE

(75) Inventor: Colin Higbie, Reva, VA (US)

(73) Assignee: AMI Entertainment Network, Inc., Bristol, PA (US)

( * ) Notice: Subject to any disclaimer, the term of this patent is extended or adjusted under 35 U.S.C. 154(b) by 0 days.

(21) Appl. No.: 12/041,073

(22) Filed: Mar. 3, 2008

(65) Prior Publication Data

US 2009/0131153 A1 May 21, 2009

Related U.S. Application Data

(60) Provisional application No. 60/975,988, filed on Sep. 28, 2007.

(51) Int. Cl.
  *G06F 17/00* (2006.01)
(52) U.S. Cl. ...................................................... 463/25
(58) Field of Classification Search .............. 463/16–25
  See application file for complete search history.

(56) References Cited

U.S. PATENT DOCUMENTS

| | | | |
|---|---|---|---|
| 4,856,787 A | 8/1989 | Itkis | |
| 5,575,717 A | 11/1996 | Houriet, Jr. et al. | |
| 5,743,799 A | 4/1998 | Houriet, Jr. et al. | |
| 5,816,918 A * | 10/1998 | Kelly et al. | 463/16 |
| 6,012,983 A | 1/2000 | Walker et al. | |
| 6,634,942 B2 | 10/2003 | Walker et al. | |
| 2002/0132660 A1* | 9/2002 | Taylor | 463/16 |
| 2003/0114217 A1 | 6/2003 | Walker et al. | |
| 2004/0102238 A1* | 5/2004 | Taylor | 463/16 |
| 2004/0162129 A1 | 8/2004 | Nelson | |
| 2005/0059484 A1 | 3/2005 | Logan | |
| 2005/0239538 A1* | 10/2005 | Dixon | 463/20 |
| 2006/0079321 A1 | 4/2006 | Walker | |
| 2006/0247026 A1* | 11/2006 | Walker et al. | 463/25 |
| 2006/0247031 A1 | 11/2006 | Walker | |
| 2006/0247041 A1 | 11/2006 | Walker et al. | |
| 2006/0258422 A1 | 11/2006 | Walker et al. | |
| 2008/0064491 A1* | 3/2008 | Taylor | 463/25 |

* cited by examiner

*Primary Examiner*—Ronald Laneau
(74) *Attorney, Agent, or Firm*—Panitch Schwarze Belisario & Nadel LLP

(57) ABSTRACT

An amusement device includes a display having a touch-screen and an input component to receive value in order to establish one or more playable credits. The amusement device also includes a controller configured to select and play at least one electronic game. The at least one electronic game is playable by a player to score a plurality of amusement points. The one or more playable credits are used to permit play of the at least one electronic game, and are different than and not based on the amusement points. The at least one electronic game also has a continue feature that provides the player of the amusement device with an option to automatically continue play of the at least one electronic game. The at least one electronic game is configured to require player input during play of the at least one electronic game in order to score amusement points.

7 Claims, 6 Drawing Sheets

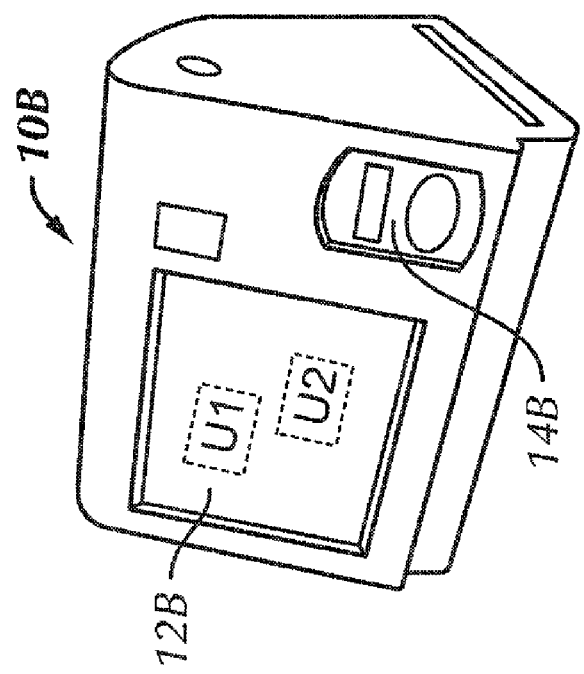
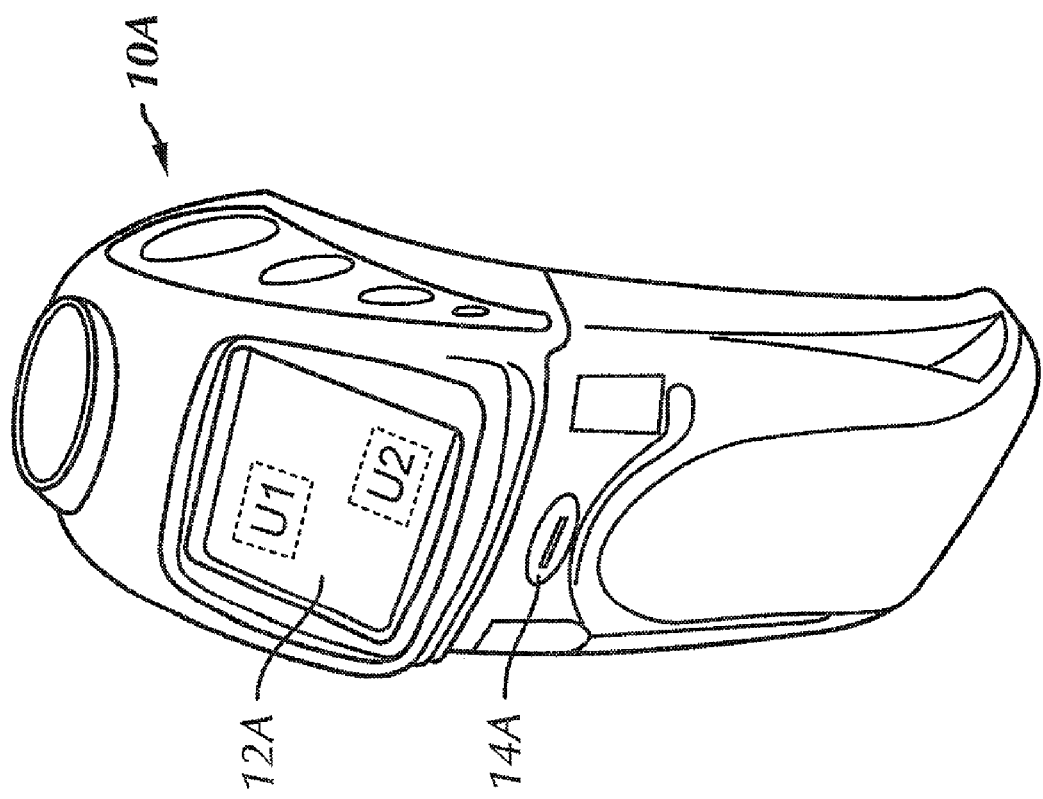

ELECTRONIC GAME HAVING AN AUTOMATIC CONTINUE FEATURE

CROSS REFERENCE TO RELATED APPLICATIONS

This application claims priority to U.S. Provisional Patent Application No. 60/975,988, filed on Sep. 28, 2007, entitled "Electronic Game Having an Automatic Continue Feature."

BACKGROUND OF THE INVENTION

An embodiment of the present invention relates generally to an electronic amusement device, and more particularly, to an electronic amusement device enabling a player to play a game with the option of automatically continuing the game.

Amusement devices having electronic games for computers and touchscreens or other types of amusement devices are generally well known in the art. Amusement devices, such as game machines, which allow a user to select games from a video display are well known in the art, such as those disclosed in U.S. Pat. No. 4,856,787 ("Itkis"); U.S. Pat. No. 5,575,717 ("Houriet, Jr., et al."); U.S. Pat. No. 5,743,799 ("Houriet, Jr., et al."), the entire contents of which are incorporated by reference herein, each of which shows a touch-screen for making a game selection from a menu of games. Such game machines or amusement devices typically operate upon input of currency (i.e., coin, token, paper money, credit/debit cards or the like) and are installed in locations such as bars, restaurants, airports, shopping malls, video arcades, casinos or the like. The game choices may include card games, sports games, games of skill, games of chance, action games, trivia games, or the like.

Electronic games in currency operated amusement devices typically play for a predetermined duration of time. Following conclusion of the time duration, a user is given a chance to continue by either purchasing more credits or deducting the cost of continuing from unused credits present in the amusement device. The option to continue is therefore disruptive as it interrupts game play, which may become bothersome to the user, especially for games where a number of continuations may be necessary to bring the game to a successful conclusion.

It is therefore desirable to provide an amusement device with a game that allows a user to choose to play the game free from the interruptions of recurrent requests to continue.

BRIEF SUMMARY OF THE INVENTION

Briefly stated, an embodiment of the present invention comprises an amusement device that includes a display having a touchscreen. An input component of the amusement device receives value in order to establish one or more playable credits. The amusement device also includes a controller configured to select and play at least one electronic game. The at least one electronic game is playable by a player to score a plurality of amusement points. The one or more playable credits are different than and not based on the amusement points. The one or more playable credits are used to permit play of the at least one electronic game. The at least one electronic game has a continue feature that provides the player of the amusement device with an option to automatically continue play of the at least one electronic game. The at least one electronic game is configured to require player input during play of the at least one electronic game in order to score amusement points.

In certain preferred embodiments, a first use of the continue feature prompts the player with the option to automatically continue play of the at least one electronic game. The prompt also offers a single continue option. Unused playable credits are available to the player when the player opts not to continue. The amusement device preferably includes a timer provided on the display. The timer indicates a time period until the next continue.

In still other preferred embodiments, the play of the at least one electronic game continues automatically when playable credits are available in the amusement device.

BRIEF DESCRIPTION OF THE DRAWINGS

The foregoing summary, as well as the following detailed description of preferred embodiments of the invention, will be better understood when read in conjunction with the appended drawings. For the purpose of illustration, there are shown in the drawings embodiments which are presently preferred. It should be understood, however, that the invention is not limited to the precise arrangements and instrumentalities shown.

FIG. 1A is a perspective view of an amusement device in accordance with a first preferred embodiment of the present invention;

FIG. 1B is a perspective view of an amusement device in accordance with a second preferred embodiment of the present invention;

DETAILED DESCRIPTION OF THE INVENTION

Figure 2:
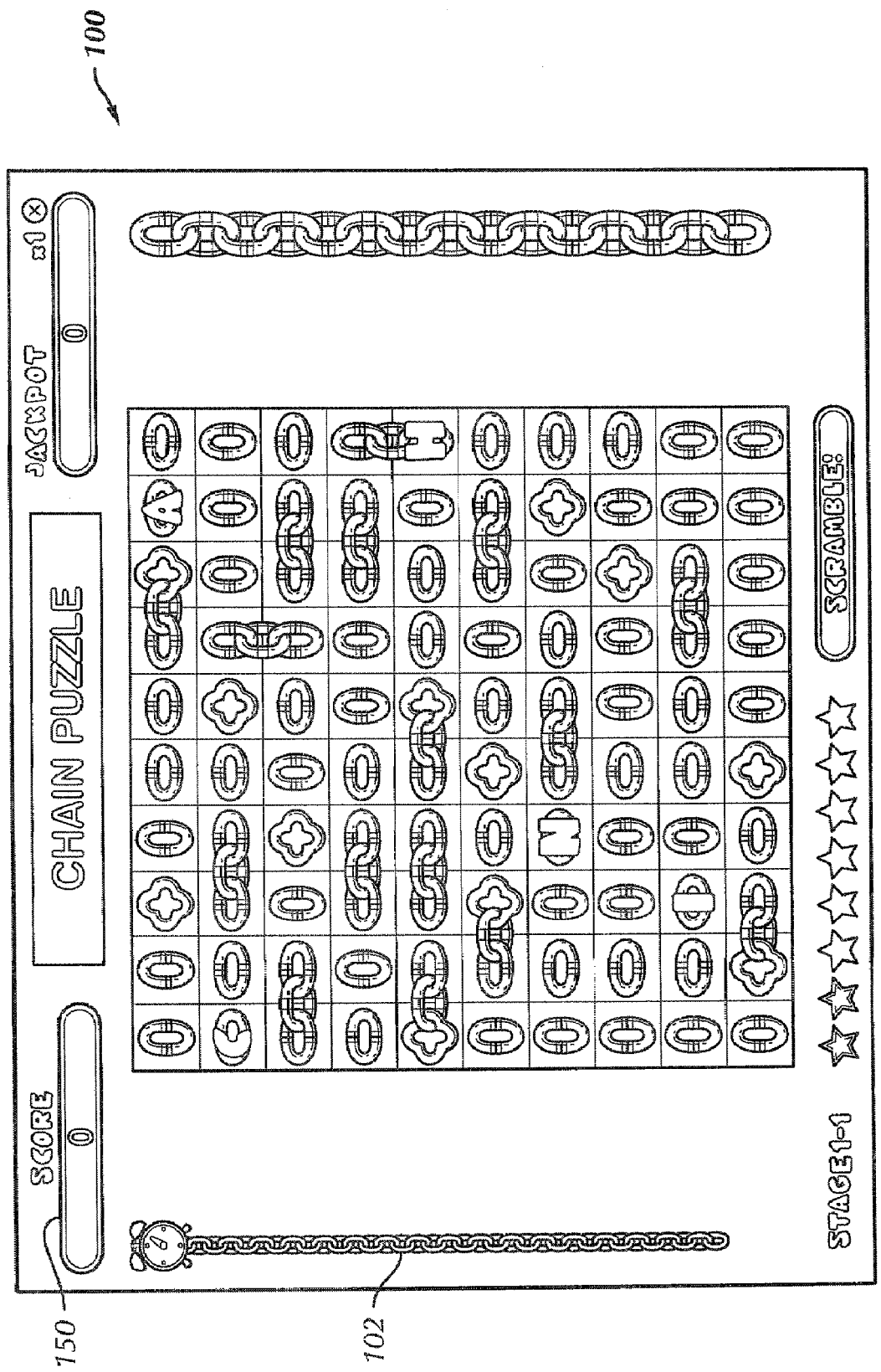
FIG. 2 is a screenshot of a game displayed on an amusement device in accordance with preferred embodiments of the present invention.

Certain terminology is used in the following description for convenience only and is not limiting. The words "right", "left", "lower", and "upper" designate directions in the drawings to which reference is made. The words "inwardly" and "outwardly" refer to directions toward and away from, respectively, the geometric center of the amusement device and designated parts thereof. The terminology includes the above-listed words, derivatives thereof, and words of similar import. Additionally, the words "a" and "an", as used in the claims and in the corresponding portions of the specification, mean "at least one." Further, the terms "coin" or "currency" should not be construed as limiting and can be used herein to mean all forms of coin and paper currency from any country as well as proprietary tokens, game cards, credit cards, debit cards, chits, or other representative forms of credit and/or payment.

Referring to the drawings in detail, wherein like reference numerals indicate like elements throughout, there is shown in FIG. 1A a first preferred embodiment of an amusement device 10A. The amusement device 10A includes a controller U1 and a memory U2. The memory U2 can be any known or suitable memory device such as random access memory (RAM), read only memory (ROM), flash RAM, hard disk, optical disk, or the like. The amusement device 10A further includes a video display 12A that is operatively connected to the controller U1. The amusement device 10A also includes at least one input component 14A that receives value in order to establish one or more playable credits. The value received may be at least one of currency, coins, tokens, chits, credits, credit cards/debit cards or the like. Although only one input component 14A is shown, the amusement device 10A may include more than one input component 14A to give a user an option for payment, for permitting multiple players, or the like. Preferably, the amusement device 10A is made operable upon actuation of the input component 14A, for example, the user may only select and play an electronic game once value is received at the input component 14A and/or one or more playable credits are issued to the user. However, free selections may be offered at the discretion of an operator of the amusement device 10A.

FIG. 1B shows another or second amusement device 10B in accordance with a second preferred embodiment of the present invention. The second amusement device 10B also includes a controller U1, a memory U2, a display 12B, and an input component 14B. Preferably, the video displays 12A, 12B are touchscreen video displays configured to accept touch input. The first amusement device 10A is a free-standing or floor-standing apparatus, whereas the second amusement device 10B is a table-top or counter-top apparatus. However, the amusement devices 10A, 10B may be arranged in any configuration including table mount, wall mount, pole mount, and the like without departing from the invention.

For convenience, the amusement devices 10A, 10B will be referred to hereinafter simply as "amusement device 10."

Turning now to the operation of the amusement device 10, the memory U2 stores one or more electronic games and a system control program. However, the one or more electronic games may also be stored remotely. The controller U1 controls the touchscreen display 12 based upon the system control program retrieved from the memory U2 and based upon inputs from the touchscreen display 12. As used herein, the system control program refers to all of the software functions outside of the electronic game files including an operating system, display control, input control, sound drivers, and the like. Other input devices which may be connected to the amusement device 10 include a pushbutton(s), a track-ball or touchpad, a mouse, a joy-stick, a foot-pedal, a voice recognition system, a keypad or keyboard, and the like. But, preferably, the input device is the touchscreen display 12.

The amusement device 10 includes an operating mode and a setup mode. When the operating mode is selected, a player or user is selectively permitted to play electronic games. When the setup mode is selected, the owner/operator is permitted to make system setup adjustments. To switch from the operating mode to the setup mode, a mode selector pushbutton (hardware not shown) is provided that is typically concealed from the users. The mode selector pushbutton may be implemented as a hidden software feature, but preferably the mode selector pushbutton is a simple pushbutton that is disposed inside a housing of the amusement device 10. In the setup mode, the owner/operator may also make adjustments to the game features as will be described in greater detail hereinafter.

In the preferred embodiments of the present invention, the controller U1 controls the display 12 based upon the system control program retrieved from the memory U2 and based upon inputs of the user. The controller U1 is configured to select and play at least one electronic game. FIG. 2 shows a screenshot 100 of an example of a game that may be played on the amusement device 10. For example, a user establishes one or more playable credits by entering value into the input component 14 and is granted a time duration for playing the game. In the example of FIG. 2, a timer 102 in the form of a chain is shown on the left-hand side of the display 12. The timer 102 indicates to the user the amount of time remaining within which the user may play the game.

The electronic game is playable by a user to score or accumulate amusement points. The number of amusement points scored by the user may be displayed in score indicator 150. The game is preferably configured to require player input during play of the game in order to score amusement points. In other words, no amusement points accrue if the user does not actively participate in the outcome of the game by, for example, actuating the input device(s) such as the touchscreen display 12.

In addition, the one or more playable credits necessary to permit play are different than and not based on the amusement points. For example, the total number of amusement points are not used to award additional playable credits. However, the amusement device 10 may offer a bonus round or replay to a user for achieving a high score. The free bonus round differs from a playable credit in that the user does not have a choice of game or the ability to reclaim value. The bonus round is simply another chance to play the same game without having to input a playable credit. The conditions for awarding a bonus round are preferably set by an operator when the amusement device 10 is in the setup mode.

Figure 3:
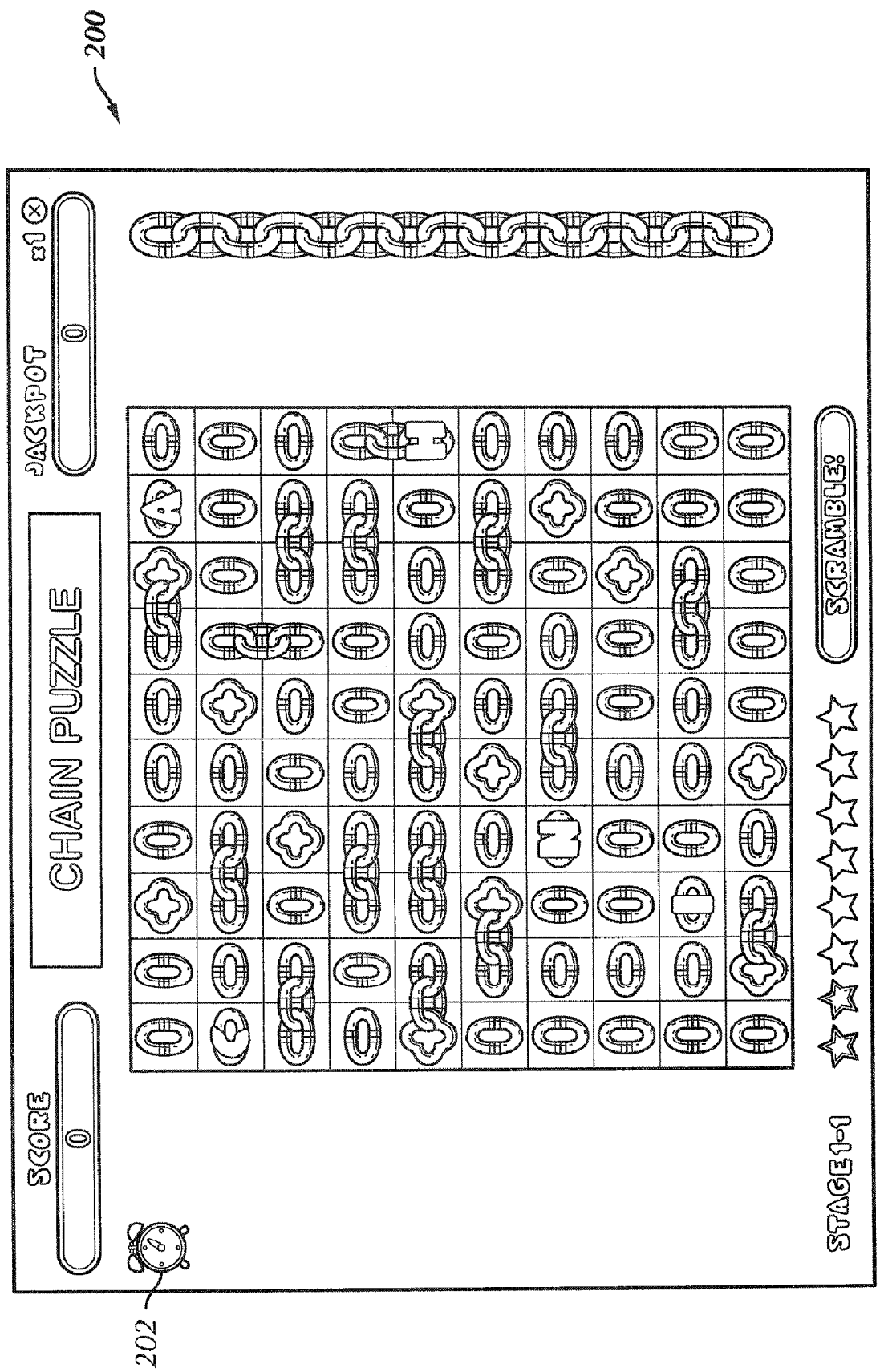
FIG. 3 is a screenshot of game with time running out displayed on an amusement device in accordance with preferred embodiments of the present invention.
Figure 4:
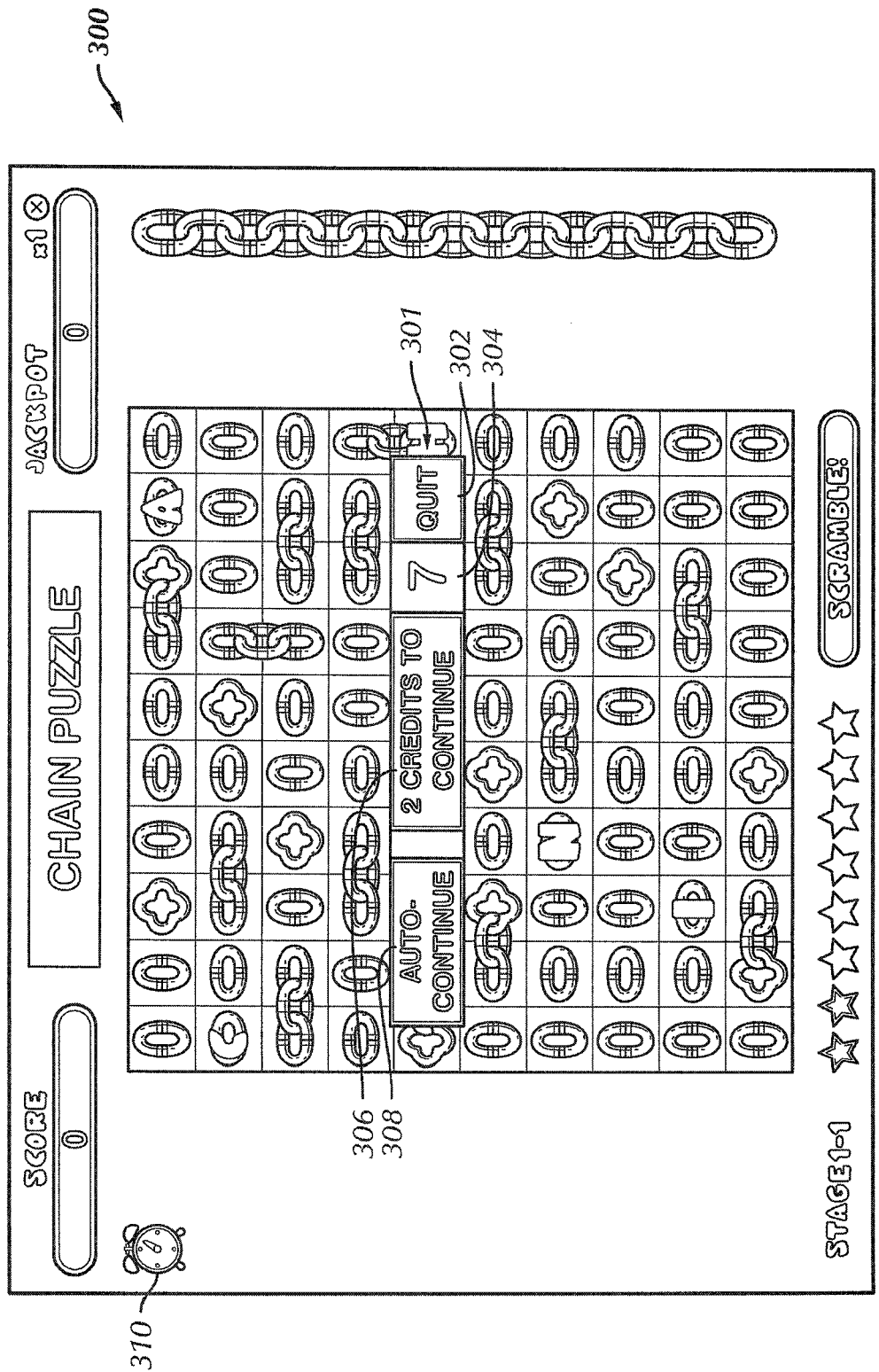
FIG. 4 is a screenshot of a continue option presented to a user on an amusement device in accordance with preferred embodiments of the present invention.

FIG. 3 shows a similar screenshot 200 of the same game of FIG. 2, but here the timer 202 is nearly expired. At the expiration of the time duration, a user will be prompted with options for proceeding. For example, FIG. 4 shows a screenshot 300 where a prompt menu 301 is displayed to the user. The user may choose the "quit" option 302, wherein any unused playable credits are made available to the user to play another game, or the unused playable credits may be returned to the user. The user may also choose the "continue" option 306, wherein a new block of time will be granted in exchange for one or more playable credits. In the example of FIG. 4, the prompt menu 301 indicates that two playable credits are required to continue the game. If the user has sufficient unused playable credits remaining in the amusement device 10 and chooses to continue, the amusement device 10 will deduct two credits from that amount. If there are insufficient credits available, the user will be required to enter more value into the input component 14 to establish the necessary number of playable credits.

Prompt menu 301 also presents a third option to the user, an option for "auto-continue" 308. When a user selects "auto-continue" 308, the game will continue as with the standard "continue" option 306. However, upon the next expiration of the timer 310, the game will automatically continue and the prompt menu 301 will not be presented to the user. Preferably, after a user has selected the "auto-continue" option 308, the game continues automatically after each expiration of timer 310 until there are insufficient playable credits available in the amusement device 10. In an alternative embodiment, the amusement device 10 does not display the prompt menu 301 to the user. The game instead automatically continues provided there are sufficient playable credits available in the amusement device 10. Only after the playable credits are depleted to a level insufficient to proceed in the game is the user prompted to establish more credits to continue.

Prompt menu 301 may also include a continue clock 304, which limits the time a user has to make a decision. After the continue clock 304 expires, the game may automatically quit and return to a main menu. Alternatively, if sufficient playable credits are still available in the machine, the game may automatically continue at the expiration of the continue clock 304.

Figure 5:
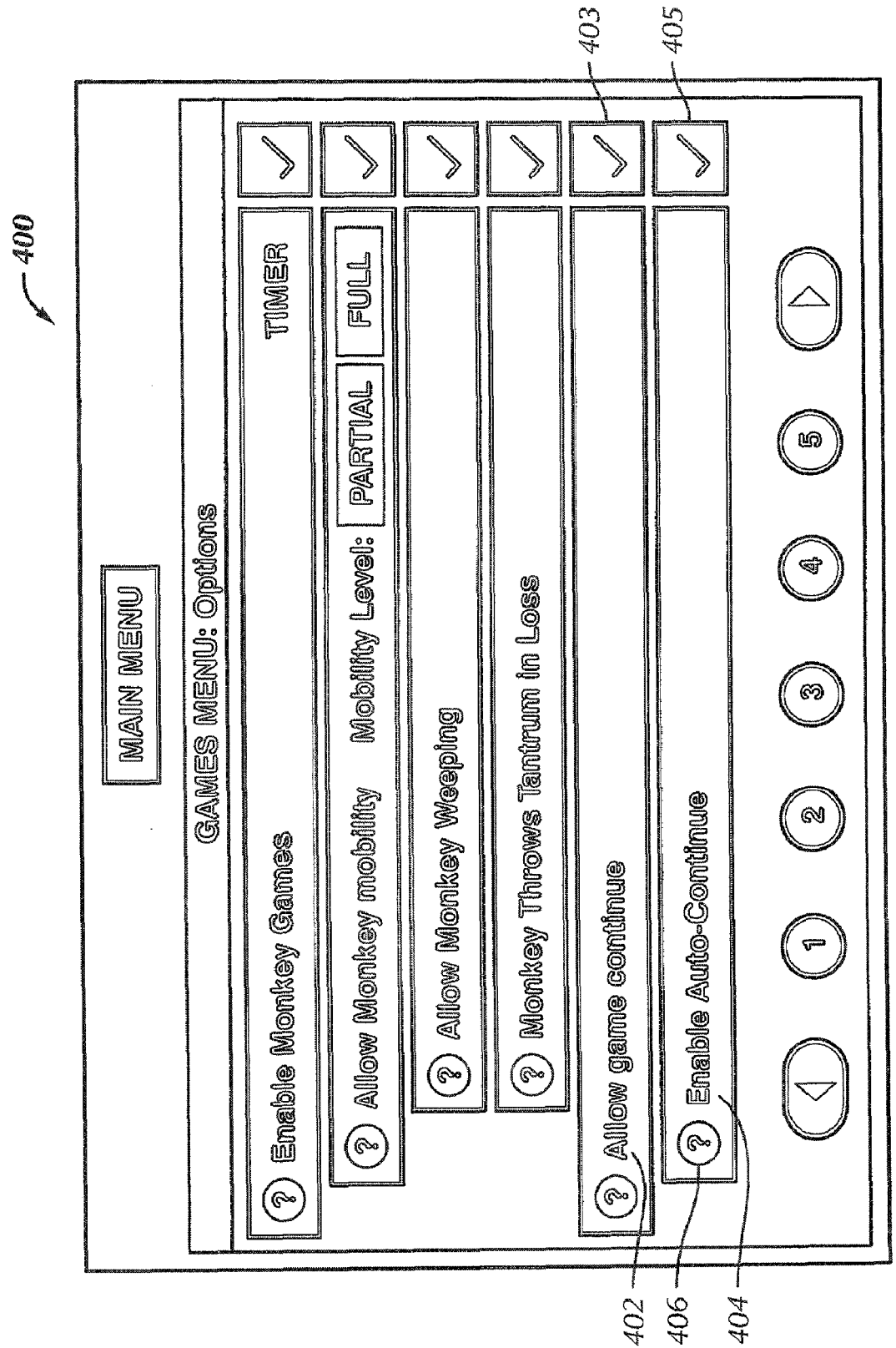
FIG. 5 is a screenshot of an operator configuration menu displayed on an amusement device in accordance with preferred embodiments of the present invention.
Figure 6:
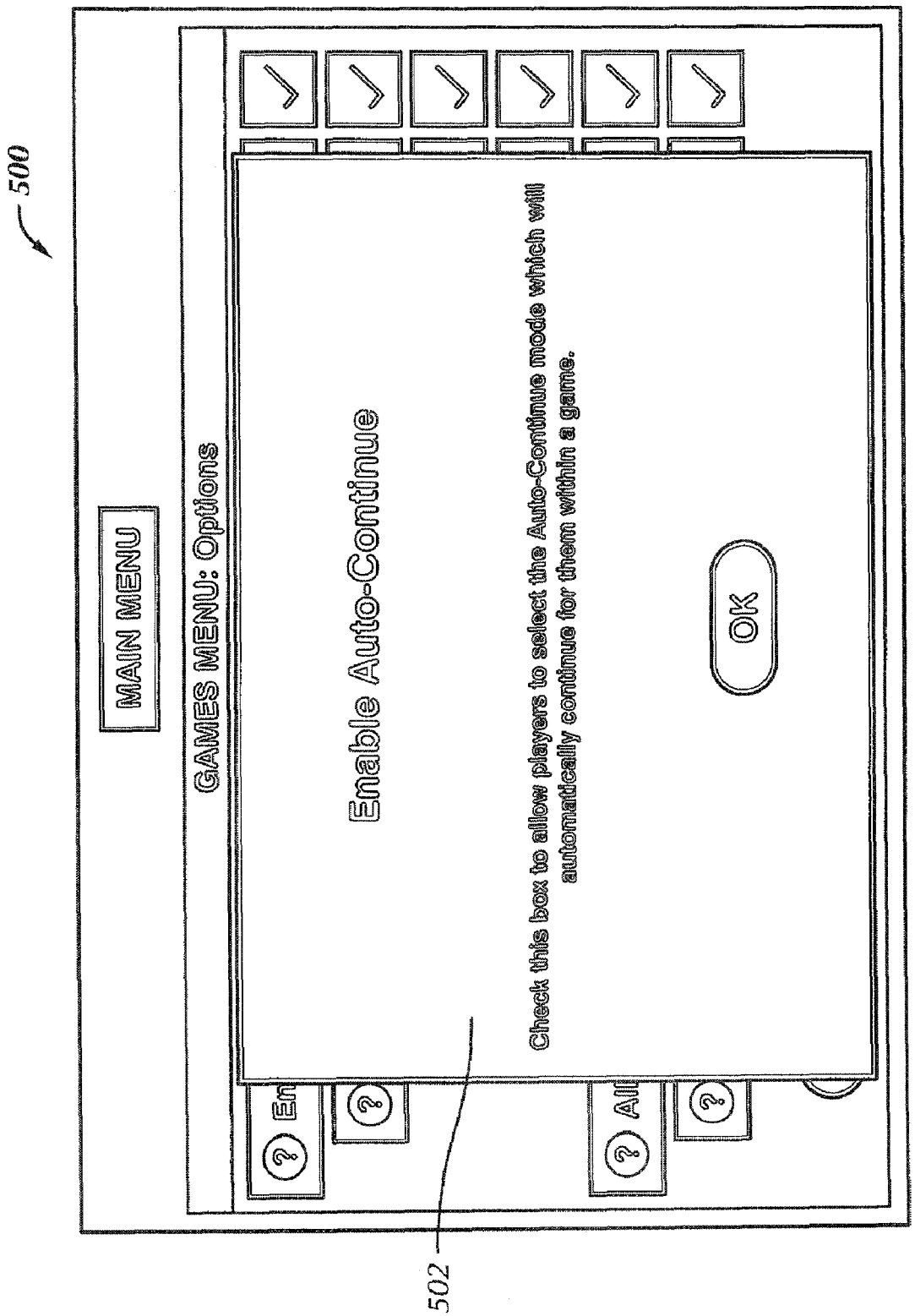
FIG. 6 is a screenshot of a "help" feature explaining "auto-continue" in accordance with preferred embodiments of the present invention.

The continue features of the game are preferably operator configurable in the set-up mode. FIG. 5 shows a screenshot 400 of an exemplary set-up menu presented to an operator of the amusement device 10. The operator may choose the option 402 to allow game continues generally by placing a check in box 403. As a subset of the general game continue ability, the operator may enable the "auto-continue" option 404 by placing a check in box 405. A help button 406 is also provided in this example, which provides information about the option to the operator. FIG. 6 shows a screenshot 500 including a help window 502 that is displayed upon the actuation of help button 406 (FIG. 5) by the operator.

Embodiments of the present invention also include methods of playing an amusement device 10 as described above.

The amusement device 10 may also include other functionality and features such as music jukebox, video jukebox, multimedia player, Internet browsing, broadcast media viewing, time based rental mode, non-prize tournaments, prize-based tournaments, head-to-head competitions, prize-based lotteries, ticket dispensing, prize dispensing, debit/credit card charging, phone card dispensing, e-mail, photography, placing customer orders, communicating with other amusement devices, and the like.

The amusement device 10 may also provide for remote or local access for accounting and/or bookkeeping purposes. The amusement device 10 may include a local connector for uploading to a hand-held or portable computer or removable memory for receiving accounting or other data. The amusement device 10 may include accounting and bookkeeping screens accessible by an operator through set up screens and/or through password protection.

From the foregoing, it can be seen that embodiments of the present invention comprise an amusement device having a game with an automatic continue feature. It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

The invention claimed is:

1. An amusement device comprising:
   (a) a display having a touchscreen;
   (b) an input component that receives value in order to establish one or more playable credits; and
   (c) a controller configured to select and play at least one electronic game, the at least one electronic game being playable by a player to score a plurality of amusement points, the one or more playable credits being different than and not based on the amusement points, the one or more playable credits being used to permit play of the at least one electronic game, the at least one electronic game also having a continue feature, the controller being further configured to present a prompt on the display providing the user with a first option to automatically continue play of the at least one electronic game when a continue is required by the at least one electronic game and a second option to manually determine whether to continue play of the at least one electronic game when a continue is required by the at least one electronic game, the at least one electronic game being configured to require player input during play of the at least one electronic game in order to score amusement points.

2. The amusement device of claim 1, wherein the prompt is displayed upon the first requirement of a continue by the at least one electronic game.

3. The amusement device of claim 2, wherein the prompt offers a single continue option.

4. The amusement device of claim 2, wherein unused playable credits are available to the player when the player opts not to continue.

5. The amusement device of claim 1, wherein a timer is provided on the display, the timer indicating a time period until the next continue.

6. The amusement device of claim 1, wherein the continue feature is operator configurable.

7. The amusement device of claim 1, wherein the value received by the input component is at least one of currency, coins, tokens, chits, credits, and credit cards/debit cards.

* * * * *